United States Patent
Cicic et al.

(10) Patent No.: US 10,355,973 B2
(45) Date of Patent: Jul. 16, 2019

(54) DATA TRANSPORT USING GEOGRAPHICAL LOCATION

(71) Applicant: Media Network Services AS, Oslo (NO)

(72) Inventors: Tarik Cicic, Oslo (NO); Jan Marius Evang, Oslo (NO); Ahmed Elmokashfi, Oslo (NO)

(73) Assignee: MEDIA NETWORK SERVICES AS, Oslo (NO)

( * ) Notice: Subject to any disclaimer, the term of this patent is extended or adjusted under 35 U.S.C. 154(b) by 446 days.

(21) Appl. No.: 14/371,299

(22) PCT Filed: Jan. 10, 2013

(86) PCT No.: PCT/GB2013/050040
§ 371 (c)(1),
(2) Date: Jul. 9, 2014

(87) PCT Pub. No.: WO2013/104907
PCT Pub. Date: Jul. 18, 2013

(65) Prior Publication Data
US 2014/0379929 A1    Dec. 25, 2014

(30) Foreign Application Priority Data

Jan. 10, 2012 (GB) .................................. 1200350.5

(51) Int. Cl.
*H04L 12/733* (2013.01)
*H04L 12/727* (2013.01)
(Continued)

(52) U.S. Cl.
CPC ............ *H04L 45/122* (2013.01); *H04L 45/58* (2013.01); *H04L 45/04* (2013.01); *H04L 45/06* (2013.01);
(Continued)

(58) Field of Classification Search
CPC ............ H04L 12/1822; H04L 12/4641; H04L 12/5695; H04L 29/06027; H04L 29/12009;
(Continued)

(56) References Cited

U.S. PATENT DOCUMENTS 7,904,586 B1    3/2011  Griffin et al.
8,284,788 B2 *  10/2012 Westphal ................ H04L 45/02
                                                      370/254
(Continued)

FOREIGN PATENT DOCUMENTS

GB    2485148 A    5/2012
WO    0199344 A2   12/2001
(Continued)

OTHER PUBLICATIONS

Oliveira et al., "Geographically Informed Inter-Domain Routing," 2007 IEEE International Conference on Network Protocols, Beijing, 2007, pp. 103-112. doi: 10.1109/ICNP.2007.4375841.*

(Continued)

*Primary Examiner* — Clayton R Williams
*Assistant Examiner* — Michael Li
(74) *Attorney, Agent, or Firm* — Withrow & Terranova, P.L.L.C.; Vincent K. Gustafson

(57) ABSTRACT

A public network links a plurality of nodes, each associated with at least one network address. A transport network connects a plurality of routers, each of which is also connected to the public network. A database holds geographical location information associated with respective network addresses on the public network. The database is used to determine which of the routers is closest to geographical locations associated with the network addresses. Information is stored that identifies these closest routers. The information is suitable for use in a routing protocol for routing (Continued)

Figure 1:
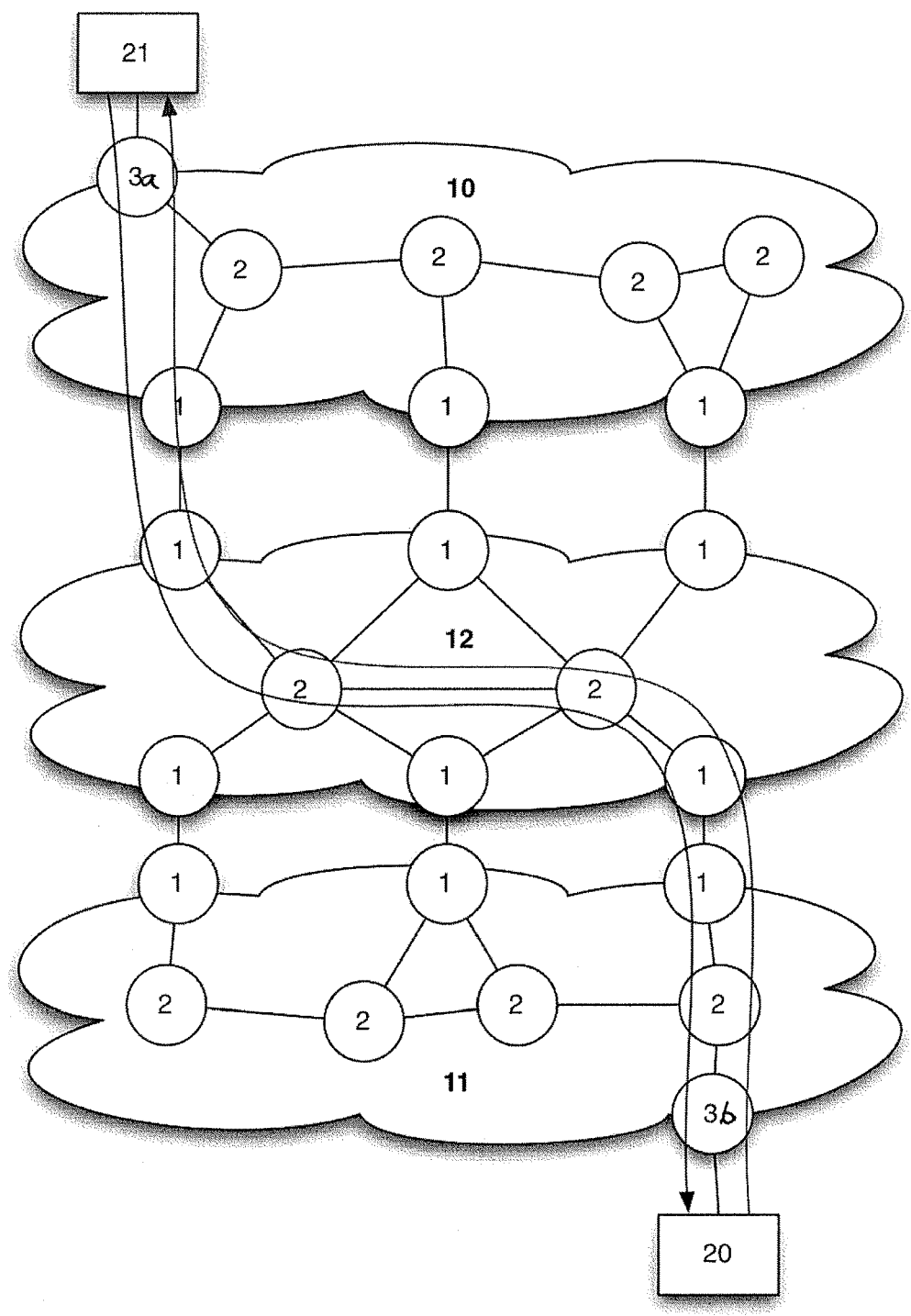

data packets through the transport network to a destination outside the transport network.

23 Claims, 2 Drawing Sheets

(51) Int. Cl.
    *H04L 12/715*      (2013.01)
    *H04L 12/721*      (2013.01)
    *H04L 12/741*      (2013.01)
    *H04L 12/775*      (2013.01)

(52) U.S. Cl.
    CPC ............ *H04L 45/121* (2013.01); *H04L 45/72* (2013.01); *H04L 45/745* (2013.01)

(58) Field of Classification Search
CPC ... H04L 29/12792; H04L 45/00; H04L 45/02; H04L 45/04; H04L 45/06; H04L 45/58; H04L 45/122; H04L 47/15; H04L 47/808; H04L 65/1043; H04L 69/22; H04L 29/12933; H04L 61/60; H04L 61/6095; H04L 61/6068; H04L 67/1002; H04L 67/1021; H04L 41/00; H04L 41/064; H04L 41/065; H04L 43/00; H04L 43/16; H04L 43/024; H04L 43/04; H04L 43/045; H04L 43/065; H04L 43/067; H04L 43/106; H04L 43/0811; H04L 45/72; H04L 45/121; H04L 45/123; H04L 45/745

See application file for complete search history.

(56) References Cited

U.S. PATENT DOCUMENTS

| | | | | |
|---|---|---|---|---|
| 2002/0112073 | A1* | 8/2002 | MeLampy | H04L 29/06027 709/240 |
| 2003/0117954 | A1* | 6/2003 | De Neve | H04L 12/4641 370/230 |
| 2005/0100027 | A1* | 5/2005 | Leinwand | H04L 29/12009 370/400 |
| 2005/0108328 | A1 | 5/2005 | Berkeland et al. | |
| 2008/0062986 | A1* | 3/2008 | Shand | H04L 45/02 370/392 |
| 2009/0323544 | A1* | 12/2009 | Gaddis | H04L 45/02 370/252 |
| 2010/0325309 | A1* | 12/2010 | Cicic | H04L 45/02 709/238 |
| 2011/0191459 | A1* | 8/2011 | Joshi | H04L 29/12792 709/223 |
| 2012/0290716 | A1* | 11/2012 | Ogielski | H04L 41/00 709/224 |

FOREIGN PATENT DOCUMENTS

| | | |
|---|---|---|
| WO | 2009084967 A1 | 7/2009 |
| WO | 2009084968 A1 | 7/2009 |

OTHER PUBLICATIONS

Bates et al., RFC 4456, "BGP Route Reflection", IETF, Apr. 2006.*
Rekhtor et. al., RFC 4271, "Border Gateway Protocol 4 (BGP-4)", IETF, Jan. 2006.*
Jiang, Yu et al., "Techniques for Determining the Geographic Location of IP Addresses in ISP Topology Measurement," Journal of Computer Science & Technology, vol. 20, No. 5, Kluwer Academic Publishers, Sep. 2005, pp. 689-701.
Oliveira, Ricardo et al., "Geographically Informed Inter-Domain Routing," Presented at IEEE International Conference on Network Protocols, Oct. 16-19, 2007, Beijing, China, IEEE, pp. 103-112.
International Search Report and Written Opinion for PCT/GB2013/050040, dated Apr. 19, 2013, 11 pages.

* cited by examiner

DATA TRANSPORT USING GEOGRAPHICAL LOCATION

This application is a 35 U.S.C. § 371 national phase filing of International Application No. PCT/GB2013/050040 filed on Jan. 10, 2013, and further claims priority to United Kingdom Patent Application No. 1200350.5 filed on Jan. 10, 2012, wherein the disclosures of the foregoing International and United Kingdom patent applications are hereby incorporated by reference herein in their respective entireties.

This invention relates to systems and methods for transporting data packets.

The Internet does not provide quality of service (QoS) guarantees, but merely routes packets using a "best effort" approach. Data packets can be delayed or lost completely. This situation can result in inadequate performance, especially when using real-time Internet services, such as videoconferencing, multi-player gaming or live television transmission, for which significant delays due to buffering and the retransmission of lost packets are unacceptable.

WO 2009/084967 and WO 2009/084968, by the present Applicant, recognise this problem and describe architectures for improving the quality of service provided to a user of a network service. They describe a dedicated transport network which connects retransmission devices (routers or transport relays) located at multiple points of presence (PoPs) using guaranteed bandwidth channels. This dedicated transport network is connected to multiple Internet Service Providers (ISPs) so that time-sensitive traffic can be routed from one ISP to another via the guaranteed channels, reducing or dispensing with the need for it to travel over less reliable public Internet links.

An application-specific selective forwarding device diverts time-sensitive packets onto the dedicated transport network. The packets are directed to a retransmission device in the dedicated transport network by using a mapping between a destination address space and the addresses of the re-transmission devices in the dedicated network. This mapping can be based on Border Gateway Protocol (BGP) routing information collected in the transport network from the connected ISPs; on network load in the transport network; or on network distance, i.e. which re-transmission device is closest to the destination address or source address.

Data packets will typically enter the dedicated transport network at the closest PoP to the source of the data packet, due to the "hot potato" routing methodologies employed across the Internet. However, the Applicant has found that naively using BGP routing information collected from connected ISPs in such a mapping can result in data packets leaving the dedicated transport network undesirably early, thereby taking longer to reach their destination than if they were able to travel on the dedicated transport network for a greater proportion of their journey.

Basing the mapping on load statistics for the dedicated transport network can also lead to packets exiting the network prematurely, while basing it on network distance can necessitate time-consuming manual adjustments to the standard BGP routing information. For example, if a customer on the west coast of the USA reports that it is receiving data packets which have exited the transport network at a PoP on the east coast of the USA, an adjustment can be made to the mapping so as to link the customer's Internet Protocol (IP) address range to a west-coast PoP. Such an approach is not scalable with increasing customer numbers.

The Applicant has now devised a better approach.

From one aspect, the present invention provides a method of configuring a data transport system, wherein the system comprises:
a public network linking a plurality of nodes, wherein each node is associated with at least one network address on the public network;
a plurality of routers and a transport network connecting the routers, wherein each router is also connected to the public network; and
a database comprising geographical location information associated with respective network addresses on the public network, the method comprising:
for each of a plurality of said network addresses, using the database to determine a closest one of said routers to a geographical location associated with the network address, according to a predetermined proximity metric; and
storing information identifying the closest router for each of said plurality of network addresses, said information being suitable for use in a routing protocol for routing data packets through the transport network to a destination outside the transport network.

Thus it will be seen by those skilled in the art that, in accordance with the invention, routing decisions for packets traversing the transport network can exploit a database of geographical information to ensure that, when desired, a data packet remains within the transport network until it reaches the nearest possible exit point to its destination. In this way, a packet can be relayed to its destination making efficient use of the transport network, which is preferably a network providing a quality of service (QoS) guarantee.

The public network may relay data packets using the Internet Protocol (IP). The public network may be any network which can be used by multiple entities, or which does not enforce access control. It is preferably distinct from the transport network. Preferably the public network is the Internet.

The nodes may be routers or gateways, which may belong to different autonomous systems (AS)—i.e. networks having registered autonomous system numbers (ASNs). Nodes may be associated with a network address by being reachable by data packets sent to that address. The network address may be advertised on the network as identifying the associated node.

In other embodiments, the nodes may themselves be respective autonomous systems. The method may thus comprise, for each of a plurality of autonomous systems which are associated with one or more network addresses, using the database to determine a closest one of said routers to a location associated with these network addresses, according to a predetermined proximity metric.

At present, complete BGP routing information for the Internet contains approximately 400,000 different IP prefixes (sets or ranges of IP addresses associated with particular nodes). Any single prefix may relate to a relatively small or relatively large geographical area. The database may comprise geographical location information for any number of network addresses, but preferably comprises geographical information for at least 100,000 IP prefixes; more preferably for substantially every IP prefix in the global BGP routing table. In some preferred embodiments the database comprises geographical location information in respect of all geographical areas with Internet presence to a resolution of equal to or finer than 10,000, 1,000, 100 or 10 square kilometres.

A network address may be a single address (e.g. a single IP address), or it may be a set or range of addresses (e.g.

specified by an IP prefix). For example, one ISP may advertise a range of IP addresses, all of which have the same associated geographical location.

The geographical location information may take any suitable form; it may comprise one or more points, or a region (e.g. a town, city, state or country), or some other location identifier such as a street within a city. Databases which provide geographical coordinates (e.g. latitude and longitude) associated with an IP address or prefix in the Internet global routing table are commercially available and are typically used for providing location-based services to customers, such as showing location-specific advertising banners on websites.

The geographical locations associated with the network addresses are preferably the physical locations of the nodes associated with those addresses (e.g. which advertise, or are identified on the network by, those addresses). For example, the location might be the city in which the data centre containing a particular router is located. The skilled person will appreciate that the geographical information in the database is not necessarily always entirely accurate, and so some of the locations associated with network addresses may only be the approximate locations of the associated nodes; e.g. a neighbouring town or city, or in the same country, or on the same continent. Benefits can still be obtained by routing data to the router closest to the geographical location associated with a destination network address, even when the location corresponds only approximately to the true physical location of the associated node.

The database may be accessible from, or located on, the public network, or it may be accessible only on the transport network; e.g. hosted on a private server.

The database may be used to determine a closest router for just a few network addresses (e.g. two, ten, one hundred, or so) or for substantially every address in the global BGP routing table.

The geographical information in the database is not necessarily static; in some embodiments, it may be updated periodically, for example using active measurements or manual entries. For instance, an incorrect or out-of-date entry may be corrected manually. Large IP subnets may cover large geographical areas and the database may therefore be amended by dividing such subnets into smaller portions, to provide more accurate geographical information.

For compactness, the database may store location information against sets or ranges of addresses (e.g. an IP prefix), rather than individual IP addresses.

The proximity metric may be straight-line distance or orthodromic distance (i.e. distance around a great circle) between two points, or any other suitable function of two locations. In some embodiments, the geographical location information may define one or more regions. The proximity metric may additionally be able to give a distance, under the metric, between a point and a region, or between two regions (e.g. between the centroids of the regions, or between the closest points on the respective boundaries). It may take account of additional geographic information, such as the locations of other network nodes or links. Different metrics could be used for different addresses; however, the same predetermined proximity metric is preferably applied in respect of each of the network addresses.

Geographical information relating to the routers, such as their locations, may be included in the database or may be determined by other means, such as from a different database in order to determine the closest router for a given network address.

The transport network may be the same as, or similar to, a dedicated transport network as described in WO 2009/084967 and WO 2009/084968, the contents of which are hereby incorporated by reference. It may be a private network, i.e. a network whose nodes are not necessarily visible to the public. It may be an autonomous system (AS). It may have access control. Such access control could, for example, take the form of a password, key or the like; or could comprise identity authentication, e.g. by means of an IP address or the like.

The transport network preferably comprises by one or more links between routers that support a guaranteed quality of service (QoS); for example, that offer a guaranteed maximum latency, minimum bandwidth for traffic, maximum jitter, or maximum packet loss. The routers may be connected by any number of intermediate nodes on the transport network; in some embodiments, the shortest path between a pair of the routers may comprise at least two or more intermediate nodes within the transport network.

Two or more of the routers may be connected to different respective IP networks on the public network. These different networks may, for example, be different Internet Service Provider networks (ISPs). Two or more of the routers may have connections to distinct physical networks which are in turn connected to the rest of the public network through respective gateways or routers. They may, for example, be situated on different respective Ethernet networks or Ethernet network segments, or on different respective broadcast domains. However, more generally, these different IP networks could be determined by logical subdivisions of an addressing space within the public network; for example, with all nodes in one of the networks sharing the same value for a predetermined number (e.g. 18 or 24) of the most-significant bits of their respective network address on the public network.

At least some of the routers of the transport network a located some distance away from each other; e.g. on different sites, in different countries or on different continents; they may be separated by tens, hundreds or thousands of kilometres. In some preferred embodiments, at least two of the routers are separated by at least ten kilometres. By having such geographically dispersed routers, a user in Paris, France can, for example, enjoy high-quality video-conferencing with a user in Tokyo, Japan, with traffic to each user travelling over a bandwidth-guaranteed private transport network and exiting at the closest Point of Presence (PoP) router to each user. These PoPs may be peered with the user's own ISP, but this is not essential and they may instead be peered with another ISP or Internet backbone provider that is relatively close to the user.

Data packets will typically enter the transport network at the closest router to the source of the data packet, due to the "hot potato" routing methodologies employed across the Internet.

The information identifying the closest routers may be stored in one or more databases or tables. These may be accessible to forwarding devices such as the application-specific selective forwarding device described in WO 2009/084967 and WO 2009/084968. It may, for example, determine a mapping between the destination address space and the addresses of re-transmission devices in the dedicated network; e.g. so that a source device directs a data packet to the router in the transport network which is closest to the packet's destination network address.

However, more preferably, the information identifying the closest routers is not used in selective forwarding devices outside the transport network, but is used in a routing protocol operating within the transport network itself; e.g. internal BGP (IBGP). The information may thus be stored in one or more databases or tables accessible to the routers within the transport network. In some embodiments, the information is stored on the routers themselves; e.g. in memory contained in the routers. The information may additionally or alternatively be stored in a route server connected to the transport network, as described below.

Such an arrangement can avoid the need for selective forwarding devices altogether, thereby reducing the level of reconfiguration of client devices outside the transport network required for the client to use the transport network.

Preferably, the plurality of routers in the transport network are configured to advertise a common network address (i.e. the same address) on the public network, e.g. using BGP. A client can then route a data packet through the transport network simply by sending the packet to a single anycast address associated with a service within the transport network. This packet should be received by the nearest router to the client device, based on the normal routing behaviour of the public network (e.g. BGP). The routing protocol running within the transport network will then direct the packet to the router in the transport network which is closest to the packet's destination, which will in turn send it on towards its destination. In the way, the data packet travels on the public network (which typically provides no service quality guarantees) for as short a distance as possible, and within the transport network (preferably with QoS guarantees) for the rest of the route. By exploiting the information identifying the closest router within the transport network itself, no additional burden is placed on devices outside the network.

The invention extends to a data transport system configured by a method embodying the invention.

Thus, from a further aspect, the invention provides a data transport system comprising:
a public network linking a plurality of nodes, wherein each node is associated with at least one network address on the public network;
a plurality of routers and a transport network which connects the routers, wherein each router is also connected to the public network; and
one or more stores of information suitable for use in a routing protocol for routing data packets through the transport network to a destination outside the transport network, the information identifying, for each of a plurality of said network addresses, the closest one of said routers to a geographical location associated with the network address, according to a predetermined proximity metric.

In all aspects of the invention, the system preferably comprises a route server, which is preferably connected to the transport network. It may be a component of one of the routers, or it may exist independently within the transport network. The route server may comprise a cluster of servers. This can provide redundancy in case of failure. It may be implemented across a plurality of geographically-dispersed servers; e.g. with at least two servers being ten or more kilometres apart, or in different countries or continents, thereby providing reduced latency. In some embodiments, the router server is not visible on the public network.

The route server may store, or have access to, the information identifying the closest router for each of the plurality of addresses. The route server is preferably configured to share routing information with the routers within the transport network; for example, using internal BGP (IBGP). It preferably acts as a route reflector. In general, a route reflector can announce a route to all border routers; in preferred embodiments of the present invention, the route server can announce a route which passes through the router which is closest geographically to the destination address. Such use of a route reflector can help ensure consistency of route selection across the transport network.

The route server can preferably disseminate closest-router information to relevant ones of the routers in the transport network, which can in turn use this information to route a data packet through the transport network so that it exits the transport network at the router which is closest to the destination address for the packet.

In some embodiments, the route server is configured to set or alter a BGP "local preference" value for a set of one or more address on one or more of the routers. Local preference is an indication as to which router is to be preferred as the next hop for a particular destination address. This can override the basic mechanism of preferring the route which traverses the fewest number of autonomous systems to reach the destination. The value may be propagated by IBGP to all the routers within the same autonomous system. A path with higher local preference is typically preferred. A local preference value can typically range from 0 to 2^32, with a default value of 100.

The route server may be configured to provide a relatively high local preference value for a set of one or more address on a router which is closest to a node on the public network which is advertising those addresses, and a relatively low local preference value for that address set on a least one, or preferably all, of the other routers in the transport network.

The route server may be configured to determine delivery-time or round-trip-time information, or other quality information, for a selected node or destination on the public network. For example, the route server may send Internet Control Message Protocol (ICMP) echo request packets and time the response, or may receive such information from another component. This information may be used to determine a preferred exit router from the transport network for a set of one or more addresses (e.g. the router providing the shortest round-trip path time to the destination).

The route server may preferably be configured to prioritise such a preference over the router determined to be closest based on geographical information. This can provide improved performance in some cases, since actual measurement data is likely to give a better indication of connection speed than the geographical information. However it is unlikely to be feasible to determine such information for more than a fraction of the sets of addresses, due to the processing and network overhead associated with collecting the measurements, and because some destinations might not respond to an ICMP echo request.

The route server may configuration a user interface, such as a web interface or a file transfer protocol (FTP) server. This could allow for manual route selection (i.e.
selecting a particular router as the exit from the transport network for a set of one or more addresses). The route server may be configured so that a manual route selection will override the router determined as closest based on the geographical information or timing measurements.

From another aspect, the invention provides a route server for use in a transport network which connects a plurality of routers, the route server being configured:
for each of a plurality of network addresses associated with nodes on a public network outside the transport network, to use a database comprising geographical location information to determine a closest one of the plurality of routers to a geographical location associated with the network address, according to a predetermined proximity metric; and to send, to at least one of the routers, information identifying the closest router for a set of one or more network addresses, the information being suitable for use in a routing protocol for routing data packets through the transport network to a destination outside the transport network.

The route server may comprise a memory for storing the closest-router information. Embodiments of the router server may have any combination of features described with reference to other aspects of the invention.

From a further aspect, the invention provides a transport network comprising:

a plurality of connected routers, wherein each router is also connectable to a public network; and one or more stores of information suitable for use in a routing protocol for routing data packets through the transport network to a destination outside the transport network, the information identifying, for each of a plurality of network addresses outside the transport network, the closest one of said routers to a geographical location associated with the network address, according to a predetermined proximity metric.

The routers are preferable connected to a public network which links a plurality of nodes, wherein each node is associated with at least one network address on the public network. The one or more stores of information preferably then identifies, for each of a plurality of network addresses on the public network, the closest one of said routers to a geographical location associated with the network address. The system may comprise a router server which may store the closest-router information, or one or more of the routers may store the information, or both.

In general, the use of a router server is not essential, and the information identifying the closest router for each of the addresses may instead be directly stored in, or distributed across, one or more of the routers in the transport network; for example, in BGP Routing Information Bases stored on the routers.

From a further aspect, the invention provides a router comprising:

one or more ports suitable for connecting the router to other routers by a transport network;

a port for connecting the router to a public network linking a plurality of nodes, wherein each node is associated with at least one network address on the public network;

means for receiving information identifying, for a set of one or more network addresses on the public network associated with a node, the router on the transport network which is closest to a geographical location associated with the network addresses in a database, according to a predetermined proximity metric; and a memory for storing said information in a format suitable for use in a routing protocol for routing data packets through the transport network to a destination outside the transport network.

The router may be configured to receive, at intervals, updated information identifying, for a set of one or more addresses on the public network associated with a node, the router on the transport network which is closest to the node according to a predetermined proximity metric applied to geographical location information relating to each node from a database.

The information may be received from a route server, as previously described. It may be sent using one or more IBGP messages, or it may be a local-preference setting instruction. The router may store the information within one or more BGP tables.

In any aspect of the invention, the geographical location information in the database may change over time; for example, it may be updated periodically or at intervals. The stored information identifying the closest router for each of the addresses may be updated periodically or at intervals. This may occur whenever the geographical information database is updated, but might be less frequent, to reduce network and processing load. The geographical database may signal when an update is available. The route server, if present, may receive this signal and, in response, use the database to store updated information identifying the closest router for each of the network addresses; e.g. by retrieving geographical location information for any new nodes or addresses, or for any nodes or addresses with amended information. Alternatively or additionally, the system (e.g. the route server) may check for updates by accessing the database at intervals and retrieving geographical information for one or more nodes. It may store updated information in respect of any of the addresses for which the associated geographical location has changed.

Similarly, the stored information may be updated (e.g. by a router server) if the association between a node and one or more addresses on the public network changes (e.g. if a new address starts being advertised by a node; if a new node starts advertising an address; or if a node changes the addresses it is advertising), or if the set of possible routes to a particular node or destination address, outside the transport network, changes. Such changes may be determined by receiving one or more external BGP messages from the public network at a router on the transport network.

It will be appreciated that any optional or preferred feature of one aspect or embodiment may equally be used in any other aspect or embodiment, wherever appropriate.

Figure 2:
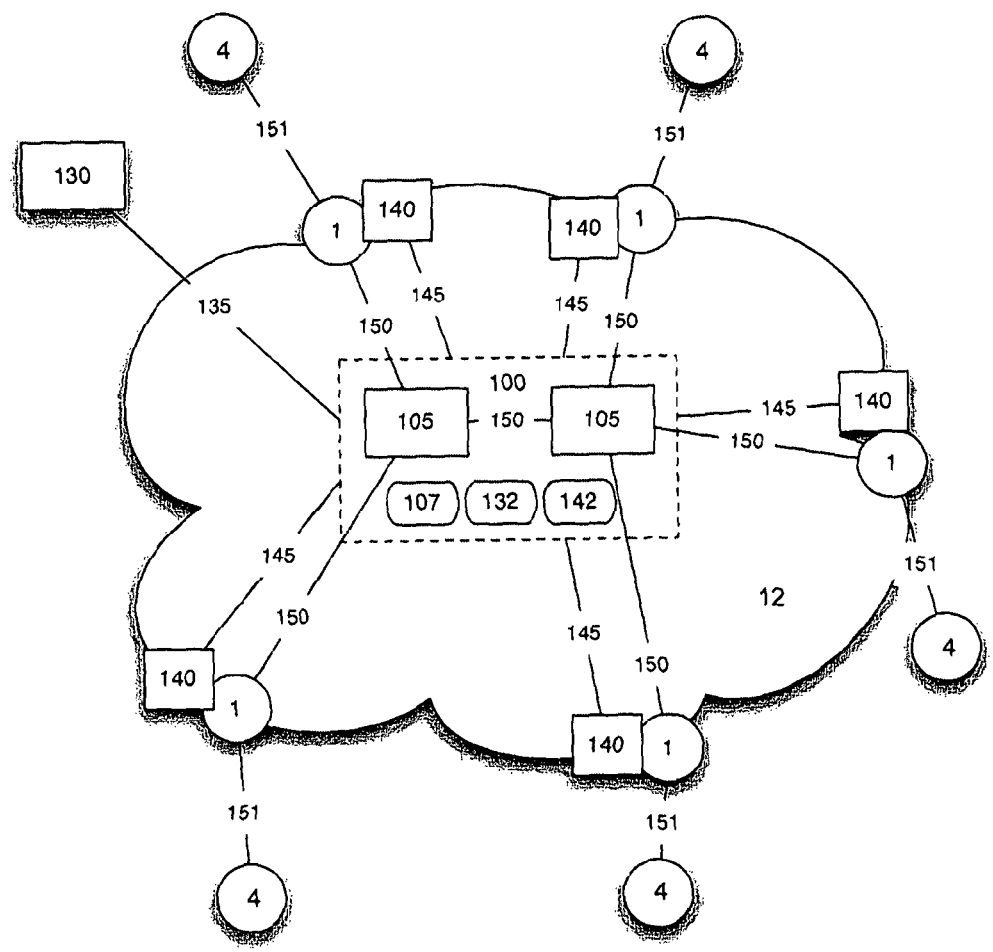

Certain preferred embodiments of the invention will now be described, by way of example only, with reference to the accompanying drawings, in which:

FIG. 1 is a schematic diagram showing data flow through a network system embodying the invention; and FIG. 2 is schematic diagram of the system illustrating the connections between significant components.

FIG. 1 shows a first ISP network 10 and a second ISP network 11, each of which is an autonomous system (AS) on the Internet. Each comprises a number of internal routers 2, which connect to other routers 2, 3 within the AS, as well as a number of external routers 1, which can connect to routers 1 on other networks.

A first customer 21 connects to the first ISP via a gateway 3a on the first ISP network 10. A second customer 20 connects to the second ISP via a gateway 3b on the second ISP network 11.

Also shown is a transport network 12 (a further AS) which has a number of internal routers 2 and external routers 1. The transport network 12 is peered with the first ISP network 10 and with the second ISP network 11 at multiple, geographically distanced points, via links between respective external routers 1 on each network.

Of course, the ISP 10, 11 and the transport network 12 will typically have many other connections to other networks and users, which are not shown here for the sake of simplicity.

The bi-directional flow of data between the first customer 21 and the second customer 20 is represented by two arrows. Data from the first customer 21 reaches the first ISP network 10 at the gateway 3a, from where it is routed via the shortest path through the first ISP network 10 to the transport network 12. This illustrates so-called "hot potato" routing, whereby the first ISP network 10 tries to get rid of the data onto the transport network 10 as soon as possible.

By contrast, it is desirable for the dedicated transport network 12 to hold onto the data for as long as possible, while sending it towards its ultimate destination with the second customer 20. This is because one or other party is typically paying for access to the transport network 12 in order to benefit from quality of service guarantees for data moving within the transport network 12; e.g. to give improved video-conferencing performance.

The routers 1, 2 within the transport network 12 therefore try to route the data to the external router 1 which is geographically closest to the second customer 20, or to a gateway 3b or router 1 on the second customer's ISP network 11, if the second customer's location is not known directly (i.e. if the second customer 20 does not have its own external BGP router, but instead uses an IP address advertised by its ISP). How they do this is explained in more detail below.

Data travelling in the opposite direction, from the second customer 20 to the first customer 21, is here shown as following the same path. This need not necessarily be the case, because the routing decisions are independently made for the two directions, at least until the data enters the transport network 12. However, in this example, the "hot potato" routing implemented by the second ISP network 11 causes data received from the second customer 20 to find the same nearest peering point between the second ISP network 11 and the transport network.

FIG. 2 shows more detail of the transport network 12 in particular.

The transport network 12 includes an enhanced route server cluster 100, which comprises two geographically distant enhanced route servers 105. These may be on different continents (e.g. one in Europe and one in America). They speak iBGP 150 to all external or border routers 1 in the transport network 12.

The border routers 1 speak eBGP 151 to external peers 4, which allows them to learn external routes to destinations outside the transport network 12.

The enhanced route server cluster 100 provides a configuration interface 107 for setting up manual routes and for system management. This may be an HTML interface served over HTTP, for example.

The enhanced route server cluster 100 has a geoIP module 132 which communicates 135 with a geographical-information database 130 using HTTP or another query-response protocol. The geoIP module 132 configures the border routers 1 to use the geographically closest border router 1 as an exit from the transport network 12 for each IP address prefix queried with the geographical-information database 130. Geographical proximity is determined by calculating the physical distance between each border router 1 and the location associated with the prefix in the database.

Each of the border routers 1 on the transport network 12 can have an active measurement agent 140 which can determine delay and quality information for particular destinations or routes. To avoid an unacceptably high volume of active measurement probes, each active measurement agent 140 is set up using a control protocol 145. By controlling the active measurement agents 140 from a central location, each agent can be used only when needed. Alternatively, it is possible to adjust the frequency at which each location is probed to reduce the load.

The same control protocol 145 or a different protocol such as a file-transfer method is used to send back the measurement data to an active-measurement module 142 within the enhanced route server cluster 100. These measurements can be used to override the routes determined using the geographical-information database where a quicker or more reliable route is found. A manual configuration of a preferred route via the configuration interface 107 will typically override both the geographically-determined and the active-measurement-based routes.

The invention claimed is:

1. A method of operating a data transport system, wherein the data transport system comprises:
    a plurality of nodes linked by the Internet, wherein each node of the plurality of nodes is associated with at least one public IP address;
    a plurality of routers and a transport network connecting the plurality of routers, wherein each router of the plurality of routers is also connected to the Internet;
    a database comprising geographical location information associated with respective IP prefixes on the Internet; and
    a route server;
    the method comprising, for each IP prefix of a plurality of IP prefixes not allocated to the transport network:
        the route server using the database to determine a respective router, of said plurality of routers, that is closest to a geographical location associated with the IP prefix, according to a predetermined geographical proximity metric; and
        the route server providing, to one or more routers of the plurality of routers, routing information identifying the respective router that is closest to the geographical location associated with the IP prefix, according to the predetermined geographical proximity metric, the routing information being stored by said one or more routers for use in routing a data packet, addressed to a destination outside the transport network, through the transport network, to a router of said plurality of routers that is closest to the destination outside the transport network to which the data packet is addressed, according to the predetermined geographical proximity metric,
    wherein providing said routing information to said one or more routers of the plurality of routers comprises setting a first Border Gateway Protocol (BGP) local preference value for an IP prefix on a router, of the plurality of routers, that is closest to a node on the Internet that advertises the IP prefix, and setting a second BGP local preference value for the IP prefix on at least one other router of the plurality of routers, wherein the second BGP local preference value is lower than the first BGP local preference value.

2. The method of claim 1, further comprising a step of using the stored routing information to route a data packet, addressed to a destination outside the transport network, through the transport network to a router, of said plurality of routers, that is closest to the destination outside the transport network to which the data packet is addressed.

3. A data transport system comprising:
    a plurality of routers and a transport network connecting the plurality of routers, wherein each router of the plurality of routers is also connectable to the Internet; and
    a route server configured to access a database comprising geographical location information associated with respective IP prefixes on the Internet, and configured to use said database to determine, for each IP prefix of a plurality of IP prefixes not allocated to the transport network, a respective router, of said plurality of routers, that is closest to a geographical location associated with the IP prefix, according to a predetermined geographical proximity metric, wherein, for each IP prefix of the plurality of IP prefixes, the route server is configured to provide, to one or more routers of the plurality of routers, routing information identifying the respective router of the plurality of routers that is closest to the geographical location associated with the IP prefix, according to the predetermined geographical proximity metric;

wherein the route server is configured to set a first Border Gateway Protocol (BGP) local preference value for an IP prefix on a router, of the plurality of routers, that is closest to a node on the Internet that advertises the IP prefix, and to set a second BGP local preference value for the same IP prefix on at least one other router of the plurality of routers, wherein the second BGP local preference value is lower than the first BGP local preference value; and wherein the data transport system is configured to use said routing information to route data packets, addressed to destinations outside the transport network, through the transport network to respective routers of said plurality of routers that are closest to the respective destinations outside the transport network to which the data packets are addressed, according to the predetermined geographical proximity metric.

4. The data transport system of claim 3, wherein the transport network is configured to provide a quality of service guarantee for data on the transport network.

5. The data transport system of claim 3, wherein the predetermined geographical proximity metric is straight-line or orthodromic distance.

6. The data transport system of claim 3, configured to route data packets through the transport network using the internal Border Gateway Protocol.

7. The data transport system of claim 3, wherein said routing information is stored in one or more databases or tables accessible to said one or more routers.

8. The data transport system of claim 3, wherein the plurality of routers is configured to advertise a common IP address on the Internet.

9. The data transport system of claim 3, wherein at least two routers of the plurality of routers are located in different countries from each other.

10. The data transport system of claim 3, wherein the route server is configured to use internal Border Gateway Protocol (BGP) to provide the routing information to said one or more routers.

11. The data transport system of claim 3, wherein the route server is configured to act as a route reflector for the plurality of routers connected by the transport network.

12. A route server for use in a transport network which connects a plurality of routers, the route server being configured:

for each IP prefix of a plurality of IP prefixes not allocated to the transport network, to use a database comprising geographical location information associated with respective IP prefixes on the Internet to determine a respective router, of the plurality of routers, that is closest to a geographical location associated with the IP prefix, according to a predetermined geographical proximity metric; and for each IP prefix of the plurality of IP prefixes, to provide to one or more routers of the plurality of routers, routing information identifying the respective router that is closest to a geographical location associated with the IP prefix, the routing information being suitable for routing a data packet, addressed to a destination outside the transport network, through the transport network to a router of said plurality of routers that is closest to the destination outside the transport network to which the data packet is addressed, according to the predetermined geographical proximity metric, wherein the route server is configured to set a first Border Gateway Protocol (BGP) local preference value for an IP prefix on a router of the plurality of routers that is closest to a node on the Internet that advertises the IP prefix, and to set a second BGP local preference value for the same IP prefix on at least one other router of the plurality of routers connected by the transport network, wherein the second BGP local preference value is lower than the first BGP local preference value.

13. The route server of claim 12, configured to use internal Border Gateway Protocol to provide the routing information to said one or more routers.

14. The route server of claim 12, configured to be a route reflector for the plurality of routers connected by the transport network.

15. The route server of claim 12, configured to determine delivery-time or round-trip-time information for data to a node on the Internet and configure one or more routers of the plurality of routers to use the delivery-time or round-trip-time information when routing data packets through the transport network to destinations outside the transport network.

16. The method of claim 1, wherein said plurality of IP prefixes not allocated to the transport network comprises every IP prefix in a global Border Gateway Protocol (BGP) routing table.

17. The data transport system of claim 3, wherein said plurality of IP prefixes not allocated to the transport network comprises every IP prefix in a global Border Gateway Protocol (BGP) routing table.

18. The route server of claim 12, wherein said plurality of IP prefixes not allocated to the transport network comprises every IP prefix in a global Border Gateway Protocol (BGP) routing table.

19. The method of claim 1, wherein the transport network connecting the plurality of routers is configured to provide a quality of service guarantee for data on the transport network.

20. The method of claim 1, wherein the transport network connecting the plurality of routers is a private network with access control.

21. The method of claim 1, wherein the transport network connecting the plurality of routers is an autonomous system (AS).

22. The data transport system of claim 3, wherein the transport network connecting the plurality of routers is a private network with access control.

23. The data transport system of claim 3, wherein the transport network connecting the plurality of routers is an autonomous system (AS).

* * * * *